United States Patent

Widl

[11] Patent Number: 6,081,388
[45] Date of Patent: Jun. 27, 2000

[54] OPTO-ELECTRONIC IMAGING SYSTEM FOR INDUSTRIAL APPLICATIONS

[75] Inventor: Andreas Widl, München, Germany

[73] Assignee: Mannesmann AG, Düsseldorf, Germany

[21] Appl. No.: 09/155,378

[22] PCT Filed: Mar. 25, 1997

[86] PCT No.: PCT/DE97/00681
§ 371 Date: Sep. 25, 1998
§ 102(e) Date: Sep. 25, 1998

[87] PCT Pub. No.: WO97/36193
PCT Pub. Date: Oct. 2, 1997

[30] Foreign Application Priority Data

Mar. 26, 1996 [DE] Germany ................ 196 13 709

[51] Int. Cl.⁷ ............ G02B 1/06; G02B 15/14; G02B 7/02
[52] U.S. Cl. .......... 359/666; 359/665; 359/667; 359/704; 359/819
[58] Field of Search ............ 359/665, 694, 359/704, 819, 820, 667, 676, 666

[56] References Cited

U.S. PATENT DOCUMENTS

| | | | |
|---|---|---|---|
| 4,331,388 | 5/1982 | McCrobine et al. | 359/666 |
| 4,407,567 | 10/1983 | Michelet et al. | 359/676 |
| 4,802,746 | 2/1989 | Baba et al. | 359/667 |
| 5,638,119 | 6/1997 | Cornuejos | 348/229 |
| 5,973,852 | 10/1999 | Task | 359/666 |

Primary Examiner—Georgia Epps
Assistant Examiner—Saud Seyrafi
Attorney, Agent, or Firm—Cohen, Pontani, Lieberman & Pavane

[57] ABSTRACT

The invention is directed to an optoelectronic imaging system for industrial applications having at least two optical lenses (1, 2) which are spaced apart from one another and an electronic image sensor (8), wherein the imaging sharpness on the image sensor (8) and the imaging scale (zoom) are mechanically adjustable by means of a control unit. According to the invention, the at least two lenses are constructed as flexible lenses (1) whose surface curvature can be changed in a controlled and reversible manner by application of externally initiated mechanical force (actuating means 15) and are arranged so as to be fixed against displacement relative to one another in the direction of the optical axis, the image sensor (8) is connected by signal links with a data processing device (14) which is, in turn, connected by signal links with the actuating means (15) of the flexible lenses (1) and delivers signals for an autofocussing function, the data processing device (14) has a storage device in which are stored values for the adjustment of the actuating means (15) for changing the focal lengths of the flexible lenses (1) for purposes of the zoom function, and the flexible lenses (1), together with the actuating means (15), image sensor (8) and data processing device (14), form a compact device unit (16).

16 Claims, 5 Drawing Sheets

FIG. 1a
FIG. 1b
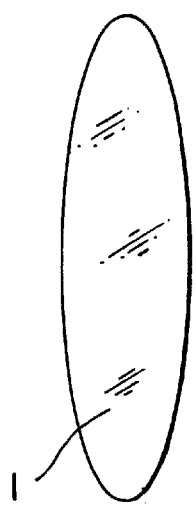
FIG. 2
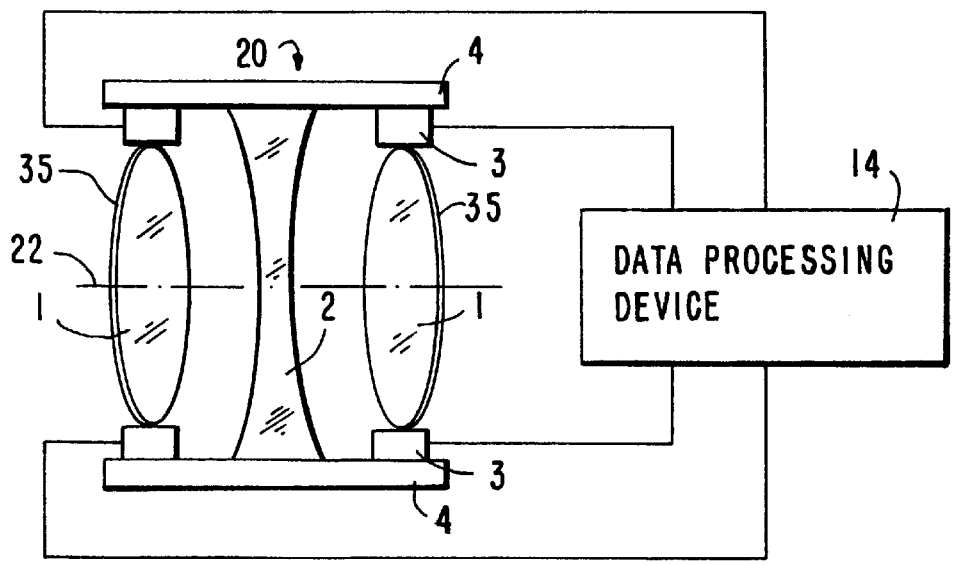
FIG. 3
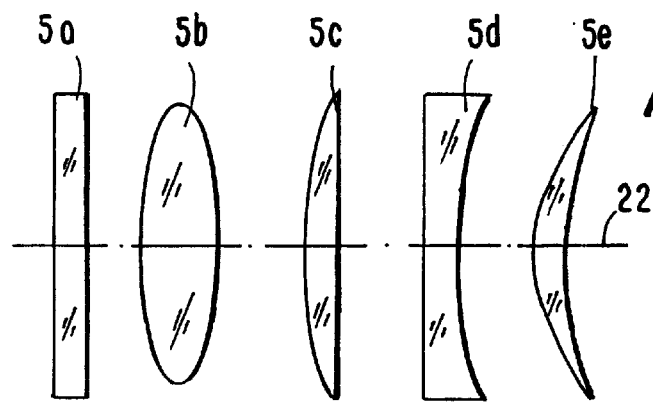

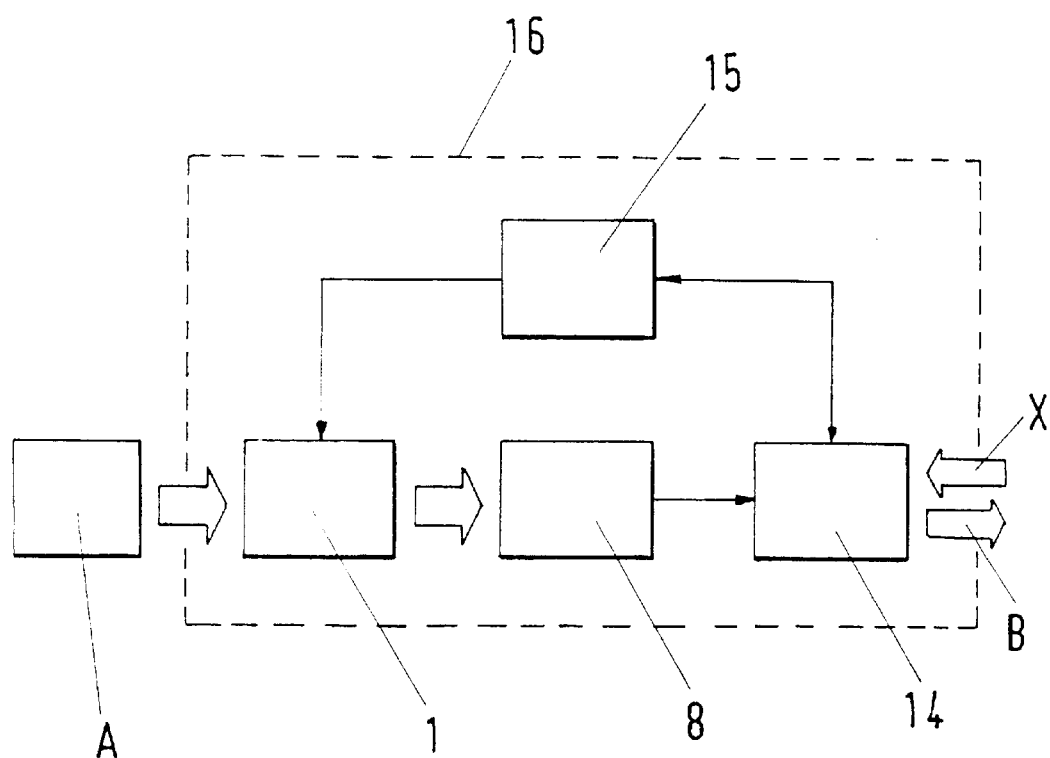

OPTO-ELECTRONIC IMAGING SYSTEM FOR INDUSTRIAL APPLICATIONS

BACKGROUND OF THE INVENTION

1. Field of the Invention

The invention is directed to an optoelectronic imaging system for industrial applications having at least two optical lenses which are spaced apart from one another and an electronic image sensor, wherein the imaging sharpness on the image sensor and the linear magnification or imaging scale (zoom) are mechanically adjustable by a control unit.

2. Description of the Prior Art

Optoelectronic imaging systems are contained in every video camera having focus and zoom capabilities. The objective lens of such a camera is generally outfitted with a device for manual and automatic focussing (autofocus) and for motor-controlled change of the imaging scale. The optical lenses of the objective are formed of solid glass bodies. To enable focussing and zooming, the axial relative distances between the individual lenses or lens groups in the objective are changed along the optical axis by means of an electric drive. Expenditure for this purpose is considerable not only with respect to the precision-mechanical drive technology, but also with respect to the space requirement for the objective (constructional volume). Infrared sensors are usually used to supply the measured values for the zoom function.

Particularly for industrial applications, the concern lies in providing devices that are as small and inexpensive to manufacture as possible. These devices can be used, for example, in the fields of security and process control, to protect plants or to observe processes. Optoelectronic imaging systems are also of great use in transportation, traffic control and manufacturing and assembly of products. For many applications, the requirements for exactness of image reproduction and resolving capability are lower than in commercial photographic and video devices, for example.

It has been known for many years that there exist possibilities for producing optical lenses whose focal length can be changed by flexible deformation of the lens body, that is, by changing the surface curvature. For example, U.S. Pat. No. 3,161,718 discloses flexible lens comprising two directly adjacent hollow bodies which are separated only by an optically transparent disk. The external surfaces of the two hollow bodies are formed by an optically transparent flexible membrane. The inner hollow body of the two hollow bodies is filled with a liquid which is likewise transparent to light. By increasing or reducing the filling volume of liquid, the curvatures of the surfaces and accordingly the focal lengths of the lens can be varied allowing for the atmospheric pressure acting externally on the membrane surface. For the purpose of further influencing the curvature shape, this reference describes an arrangement by means of which the pretensioning of the membrane walls can be changed independent from the pressure of the liquid filling.

A device designed as spectacles is known from GB 1 209 234, the glasses of these spectacles being constructed as flexible lenses which have a variable focal length, again through changing their liquid filling. Further, the publication "Silicone rubber applied within the eye: a preliminary study", Applied Optics, May 1, 1979, Vol. 18, No. 9, pages 1305 to 1310, describes the possibility of the medical use of flexible lenses which are intended for implantation in the human eye as a substitute for natural lenses. In this case, the lens is not provided with a liquid filling, but rather is formed of a solid elastic plastic material. Further, reference is had to the article "Variable-focus liquid-filled optical lens", Applied Optics, Aug. 1, 1993, Vol. 32, No. 22, pages 4181 to 4186, wherein the test results with respect to the imaging characteristics of liquid-filled flexible lenses are shown.

FR 26 34 287 describes an objective which has two or more liquid-filled lenses whose surface curvature can be changed manually by a dispensing or metering piston for the liquid which is adjustable by means of a screw.

U.S. Pat. No. 4,407,567 discloses an optoelectronic imaging system having three flexible lenses arranged at a fixed distance along the optical axis. The surface curvature of the flexible lenses can be changed in a controlled and reversible manner by means of piezo-actuators. A data processing device which applies a corresponding electric voltage to the piezo-actuators for adjusting defined surface curvatures is provided for this purpose. The data processing device is provided with two input devices through which actuating values for adjusting the imaging scale (zoom) and for focussing can be entered by the user of the imaging system. The flexible lenses and the actuating means form a device unit together with the data processing device. As can be seen from the further details given in the embodiment examples which work as alternatives to the flexible lenses with flexible concave mirrors, this optoelectronic imaging system can assume considerable dimensions since a distance between the outermost concave mirrors of 0.4 m to 3 m is indicated.

U.S. Pat. No. 4,802,746 discloses another optoelectronic imaging system in which the imaging is carried out on an electronic image sensor. The optics of this imaging system comprise two conventional lenses and a flexible lens whose surface curvature can again be changed in a controlled and reversible manner by piezo-actuators. The electric voltage for adjusting the piezo-actuators is regulated by a microprocessor. This microprocessor selects its actuating information for the voltage supply on the basis of the findings of a unit for determining image sharpness which detects the image sharpness by evaluating individual image sections during brief changes in the surface curvature of the flexible lens. In this system, which provides only one individual flexible lens, a zoom function would not be possible without axial displacement of the conventional lenses.

SUMMARY OF THE INVENTION

It is the object of the invention to provide an optoelectronic imaging system suitable for industrial applications which is as inexpensive as possible to produce, has a comparatively small constructional volume, and enables an imaging quality adapted to requirements.

This object is met for an imaging system by an optoelectronic imaging system for industrial applications having two flexible optical lenses mounted on a housing spaced apart from each other and fixed against displacement relative to each other along an optical axis, wherein the surface curvature of the two flexible optical lenses is adjustable in a controlled and reversable manner by application of an externally initiated manual force via an actuating means. Imaging sharpness and imaging scale are mechanically adjustable by a data processing device signally connected to the actuating means. The data processing device includes stored values for adjusting the actuating means for changing the focal length of the flexible lenses and thereby changing the image scale (i.e., for the zoom function). An electronic image sensor records an image and is connected together with the data processing device on an electronic chip. Each of the two lenses, the data processing device, the image sensor, and the actuating device are mounted together as one unit.

According to the invention, the objective for ensuring the imaging on the electronic image sensor with a sufficiently sharp focus and in the desired imaging scale is provided with at least two flexible lenses which are arranged at a distance from one another along the optical axis of the objective. The focal length of the flexible lenses can be changed in the desired manner by changing the surface curvature of the flexible lenses by application of externally initiated mechanical force via an actuating means. The deformation is carried out in a monitored manner and is reversible due to the flexibility of the lens material. Because of the variability of the focal lengths, the displacement of individual lenses or groups of lenses along the optical axis which was required heretofore in conventional objectives is dispensed with. This means that the devicerelated expenditure required for this purpose is obviated. The flexible lenses thus have a fixed axial distance from one another.

A substantial feature of the invention consists in that the actuating means on the one hand and the image sensor with an electronic data processing device on the other hand are connected by signal links, wherein the programming of the data processing device is set up in such a way that the signals delivered by the image sensor to the data processing device are evaluated for the purpose of an autofocussing function. Thus, blurred edges and lines, for example, can be corrected by means of gradient image analysis (e.g., determination of centroid). In general, correcting variables for regulating object distance can be derived from an analysis of the gray value image, especially of the quantity and sharpness of edges, so that an automatic adjustment of the image sharpness (autofocus) is made possible in a simple manner at least in the case of small changes in the object distance. The imaging system according to the invention therefore requires no additional sensor arrangement (e.g., infrared sensors) for the autofocus function.

According to a further feature of the invention, the electronic data processing device purposely adjusts the surface curvature, and therefore the focal lengths, of the flexible lenses by corresponding actuating signals to the actuating means in such a way that a desired imaging scale (zoom function) results. This can be realized with relatively little expenditure in that combinations of adjustment values for the required surface curvatures of the flexible lenses, i.e., for the actuating signals to be sent to the actuating means, are stored in a storage of the data processing device for the different desired zoom stages. These adjustment values can be determined and stored by empirical trials and/or mathematical simulations, that is, in a one-time action. Of course, the adjustment values can also be deposited in the storage of the data processing device in functional form rather than as value tables.

Finally, the essence of the present invention is characterized in that the imaging system is constructed, in its entirety, as a compact device unit comprising not only the system of flexible lenses and the image sensor, but also the electronic data processing device and the actuating means. This results in an extremely capable optoelectronic "sensor" which, by reason of its inherent intelligence (integrated electronic data processing device), delivers sufficiently good image signals and requires only a small fraction of the space required for a corresponding unit in conventional technology. The drastic reduction in constructional volume is also accompanied by an appreciable reduction in manufacturing cost. It is especially advantageous when the data processing device which is constructed as a microcomputer is arranged together with the image sensor on a common electronic chip. This is advantageous with respect to the lowest possible production costs (assembly) as well as with respect to the reliability and processing speed of the imaging system according to the invention.

In a particularly advantageous manner, the programming of the electronic data processing device is expanded to include an electronic image correction unit. By means of pixel operations, as they are called, a corresponding image correction can compensate for, or at least minimize, distortions due to inadequate adjustment of the surface curvature of the flexible lenses. The image correction unit can be easily calibrated by methods, known per se, of electronic image processing. For example, in the case of an object with straight edges that appear curved in the image, this correction unit can be adjusted in such a way that the imaging has extensively faithfully reproduced straight edges with corresponding proportions under the defined conditions. In most cases, the expenditure for this purpose is very low because, as was already stated above, the requirements for accuracy of imaging are not extremely high. Since the type of distortion is known in advance, corresponding correction values can be stored in the storage of the electronic data processing device depending on the adjustment values of the flexible lenses. It is also possible to generate a sharp image through image addition. This makes use of the effect whereby individual image areas are alternately sharp or blurred in different settings of the focal length of the flexible lenses (while retaining the zoom stage of the imaging system). For example, when the central area is sharp in one setting, a middle area located around the center is sharp in a second setting, and the edge area of the generated image is sharp in a third setting, an image which is sufficiently sharp as a whole can be compiled by the electronic data processing device by adding each of the sharp areas, that is, can be assembled from three images. Through the possibility of electronic image correction within the compact imaging system of the invention, an inexpensive zoom objective can be provided which, if needed, offers extreme wide-angle characteristics (fisheye objective) with extensive compensation of the image distortions that necessarily follow without requiring an elaborate special computer system for image reprocessing.

In another advantageous further development of the invention, the electronic data processing device is utilized for electronic brightness regulation. In an imaging system comprising, e.g., two flexible lenses with a fixed diaphragm arranged therebetween, different surface curvatures of the lenses lead to different effective lens apertures and accordingly to different amounts of light striking the image sensor. Consequently, the image brightness is correspondingly changed. By means of computer simulation of a zoom objective of this kind, for example, it is possible to determine the relationship between the respective adjustment values of the actuating means (i.e., of the respective lens curvature) and the light intensity on the image sensor. The correction values which can be derived therefrom for compensating such fluctuations in the image brightness can be stored in the storage of the electronic data processing device in a manner corresponding to the correction of image distortions as a function of the lens setting values. The correction of the image brightness can be regulated by changing the exposure time at the image sensor and by suitable amplification of the image sensor signals.

In addition to the at least two flexible lenses, an imaging system according to the invention can also be outfitted with one or more conventional lenses with fixed focal length. This can be useful in order to increase the possible range of focal length adjustment and/or the zoom area. Further, the degree of aberration can be reduced if needed.

It is also possible in principle to use mirrors with flexible surfaces whose curvature can be adjusted mechanically in a controlled manner as "flexible lenses" within the meaning of the invention. However, since the image sensor can not be arranged on the optical axis as can be carried out in the case of an objective with optical lenses that are transparent to light, but rather must be arranged so as to be offset laterally in the beam path of the light deflected by reflection, extensive aberrations and therefore, e.g., considerable distortions of the imaging, result from the imaging behavior of curved mirror surfaces. Therefore, flexible lenses which are either formed from a unitary flexible transparent material in the portion utilized for the light beam path or are formed as liquid-filled hollow bodies are preferred within the framework of the present invention, wherein at least one, preferably both outer surfaces are formed of membrane walls of a flexible material which is transparent to light. In the case of liquid-filled flexible lenses, suitable filling liquids are especially those liquids which have a low dispersion and accordingly minimize chromatic aberration. Since the static pressure of the filling liquid has an effect on the deformation of the comparatively thin membrane walls, the total volume of liquid should be kept as small as possible in order to exclude unwanted and poorly controllable deformations of substantial extent from the outset. In an advantageous embodiment form of the liquid-filled lens, the membrane walls are not provided with a uniform thickness, but rather are selected so as to vary in magnitude in the radial direction from the optical axis to the periphery of the lens. In order to compensate for imaging errors, it may be advisable to provide, e.g., diffractive structures on the surface of the flexible lens which result in reduced chromatic aberrations in combination with refractive components. Further, the refractive index of the lens could be variably configured depending on the radius (gradient lens) in order to alleviate monochromatic aberrations.

In the case of liquid-filled flexible lenses, the change in the surface shape, that is, the curvature of the lens, can be influenced in a manner known per se by changing the filling volume. For this purpose, corresponding liquid delivery devices, for example, digitally controlled metering pumps, are provided. Since the diameter of the flexible lenses can be kept small for most applications, the liquid volumes to be conveyed into or out of the interior of the lens for adjustment of the focal length are very small. Therefore, micro-actuating pumps (e.g., piezo-electric pumps) are also possible for this purpose. A completely closed liquid system in which the volume of a liquid reservoir is changed simply by means of external force acting against the springing force of the flexible lens through deformation can also be used. Dimethyl silicone oil, for example, is suitable as a liquid.

When the flexible lens is produced from a solid homogeneous flexible material, the mechanical forces required for deformation of the lens surface during adjustment of the desired focal length can advantageously be applied by means of piezo-actuators. For controlling purposes, these actuators, as well as the liquid conveying means in the case of liquid-filled flexible lenses, are connected by signal links with the electronic data processing device which carries out the adjustment of focal length in a controlled manner. In order to keep the degree of the occurring aberration small, one or more diaphragms can be arranged in the beam path of the imaging system according to the invention. In order to enable an adjustability of the diaphragm aperture without having to compromise with unwanted expenditure for a mechanical, adjusting mechanism, it is provided in a further development of the invention to design a diaphragm of this type in a manner similar to a liquid-filled flexible lens. This means that the diaphragm is likewise constructed as a liquid-filled hollow body whose external surfaces are formed by membrane walls which are transparent to light. In this case, however, an opaque liquid filling is provided instead of a transparent liquid filling. Further, the axial distance between the two membrane walls located opposite one another is comparatively small. Due to ambient pressure acting externally, the removal of liquid from the hollow space leads to an inward concave curvature of the two membrane walls and results in direct contact between the membrane walls in the region of a circular area around the optical axis. Depending on the magnitude of liquid volume removed from the hollow body, the circular area in which the area contact of the membrane walls is adjusted varies in size. Since there is no longer any liquid effecting a separation in the region of the contact surface, the diaphragm aperture occurs in this region.

The invention will be described more fully hereinafter with reference to the embodiment examples shown schematically in the Figures.

BRIEF DESCRIPTION OF THE DRAWINGS

FIGS. 1a and 1b show a flexible lens in different deformation stages;

FIG. 2 shows an optical system according to an embodiment of the present invention with two flexible lenses and a conventional lens;

FIG. 3 shows various membrane shapes for the flexible lens of FIGS. 1a and 1b;

FIG. 9 shows a block diagram of an imaging system according to the present invention.

DETAILED DESCRIPTION OF THE PREFERRED EMBODIMENTS

Figure 4:
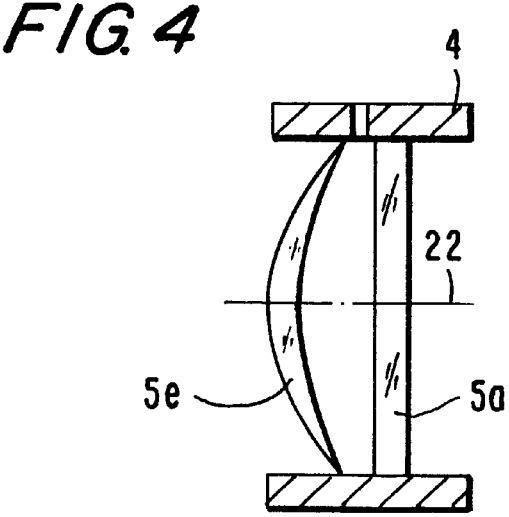
FIG. 4 shows a housing having a flexible lens of FIG. 3 with a profiled membrane and another flexible lens of FIG. 3 having a uniformly thick membrane wall.

A flexible lens 1 according to an embodiment of the present invention is shown in FIGS. 1a and 1b and comprises a unitary flexibly deformable elastic material which is transparent to light and has refractive properties. In principle, a material such, for example, as a polymer having a high refractive power with the least possible dispersion in addition to excellent capability of changing shape should be selected for this purpose. Further, these material characteristics should persist over very long periods of time as far as possible. The surface curvature of a lens of this type can be changed and the focal length of the lens can therefore be adjusted to different values by means of compressive or tensile forces externally applied to the periphery. In FIG. 1a, the lens 1 shown in cross section, is drawn apart to form a relatively flat body by means of tensile forces acting radially outward FIG. 1b shows a state of the lens 1 in which the lens is reduced in diameter by external compressive forces and the thickness, and therefore also the surface curvature, is increased.

Shown in a simple embodiment example in FIG. 2 is an optical system 20 for an imaging system according to the invention which has two flexible lenses 1 that are arranged at an axial distance from one another along the optical axis 22. The housing in which the lenses 26, 28 are accommodated is designated by reference number 4. A conventional glass lens 2 with concave curvature on both sides is arranged between the two flexible lenses 1. The conventional glass lens 2 of the kind mentioned above with fixed focal length is particularly advantageous in the case of small lens apertures, small changes in the lens focal length and large object distances. In many cases, the necessity of switching the flexible lenses 1 from the concave region to the convex range, or vice versa, can be avoided by means of an additional conventional lens. In an optional embodiment, diffractive structures 35 may be arranged on the surfaces on the flexible lenses to compensate for optical aberrations. In order to influence the degree of curvature of the two flexible lenses 1, piezo-actuators 3, indicated schematically in the drawing, are arranged in the circumferential area of the lens and controllably connected to a data processing device 14 which transmits signals to the piezo-actuators corresponding to a required curvature.

Membrane walls with different cross-sectional shapes can be used to produce a flexible lens with liquid filling. This can be advantageous particularly with respect to reducing optical aberrations. FIG. 3 shows a plurality of differently shaped membranes 5a to 5e. FIG. 4 shows an embodiment example in which two different membrane walls 5e, 5a are used. Membrane wall 5a is of a very simple type and has a uniform thickness along the entire cross section. In contrast, the thickness of membrane wall 5e increases outward in the radial direction in a continuous manner proceeding from the optical axis. Further, the membrane wall 5a is constructed so as not to be completely planar in the unloaded state, but rather already has an outward convex curvature.

Figure 5:
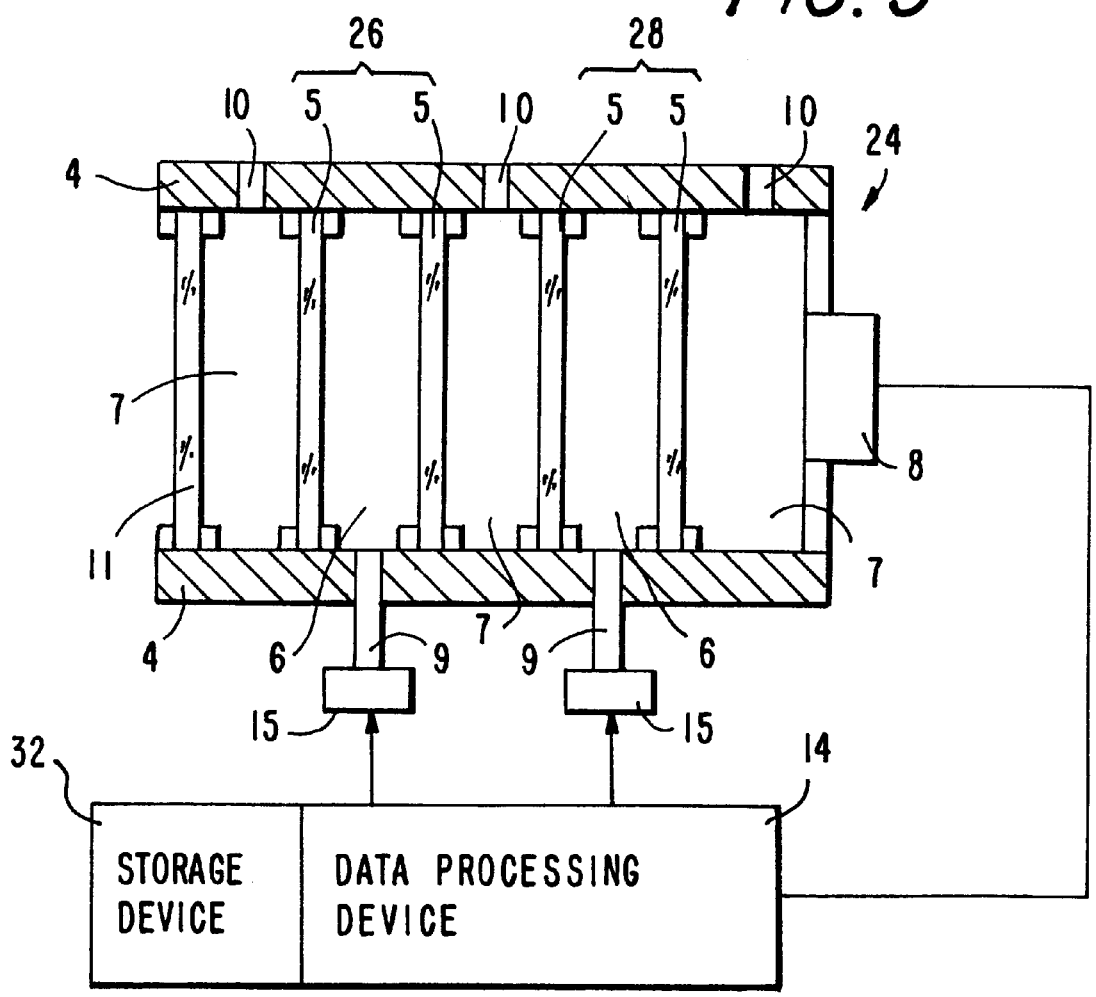
FIGS. 5 and 6 show an imaging system according to an embodiment of the present invention in various operating states.
Figure 6:
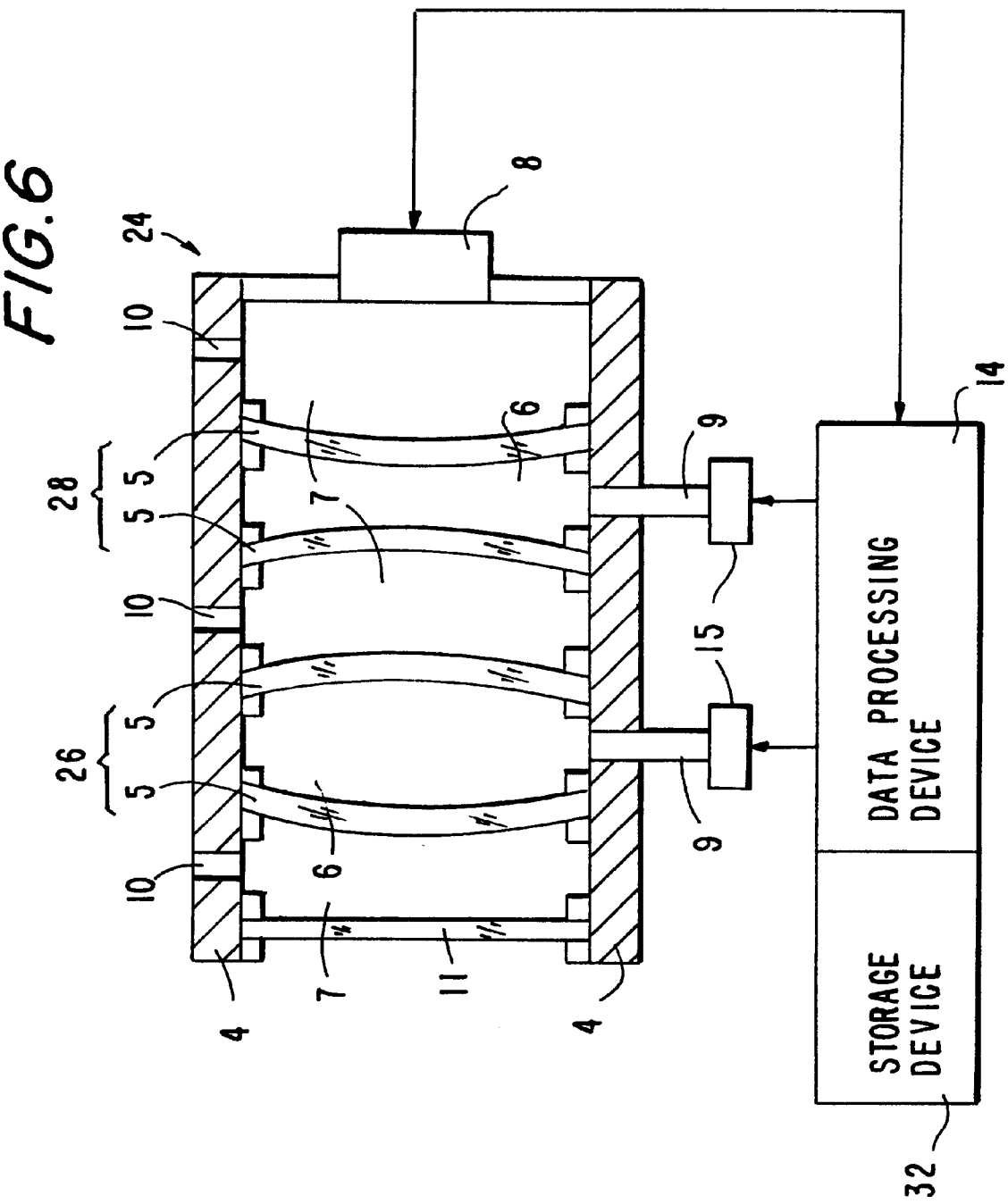

An imaging system 24 with two flexible liquid-filled lenses 26, 28 is shown in different operating states in FIGS. 5 and 6. The housing 4 in which the optics are accommodated is closed outwardly on the light inlet side by a transparent rigid disk 11. Two flexible lenses are 26, 28 arranged at a distance axially from one another and have a hollow space 6 enclosed by two membrane walls 5 and, in the circumferential region, by the housing 4. A liquid which is transparent to light and has low dispersion characteristics can be introduced into the two hollow spaces 6 and removed from the latter again through feed lines 9, via an actuating means 15 so that there is a pressure difference on the two sides of the membrane walls 5. The internal volume is designed as small as possible for narrowly limiting the required hydrostatic pressure of the liquid. A hollow space 7 which is preferably filled with gas (e.g., air) is provided between the two flexible lenses and on the left-hand and right-hand side of the latter, respectively. A pressure balance with the environment can be carried out in these hollow spaces 7 through openings 10 in the housing 4. An electronic image sensor 8 is indicated schematically at the right-hand side wall of the housing 4. During operation, the two flexible lenses 26, 28 assume a curved outer shape as is shown by way of example in FIG. 6. When the left-hand flexible lens is filled with additional liquid, its membrane walls 5 curve outward resulting in a convex lens shape. The gas filling in the two directly adjacent intermediate spaces 7 can pass outward in part through the openings 10 for pressure equalization. In the case of the right-hand flexible lens, a portion of the liquid volume originally present in the unloaded state was removed from the interior 6. The pressure difference due to the reduction in volume causes a concave curvature of the two associated membrane walls 5. Instead of a simple pressure equalization in the intermediate spaces 7 arranged directly adjacent to a flexible lens, it is also possible to purposely influence the internal pressure in these intermediate spaces 7 (overpressure or underpressure) in order to aid deformation of the respective membrane walls. In principle, it is also possible, although less advantageous because of the difficulty of metering, to provide only a pressure balance for the liquid filling of the flexible lenses and to influence the respective fill volume exclusively by the pressure of the medium adjusted in the intermediate spaces 7. By changing the degree of curvature of the flexible lenses which is adjusted in a controlled manner by means of an electronic data processing device, 14, the focal lengths of the two flexible lenses 26, 28 can be purposely adjusted in such a way that the respective object is shown in a focussed manner on the image sensor 8. Moreover, it is possible to change the imaging scale on the image sensor 8 in a desired manner through suitable focal length adjustment. No axial displacements of the two lenses 26, 28 are required for this purpose. The data processing device includes a storage device which includes stored values related to adjustments of the actuating means 15 for specific setting of the image scale. The data processing device 14 further being programmable in the manner of an image correction unit to compensate for optical imaging errors, especially distortions due to inadequate adjustment of the surface curvature of the flexible lenses 1.

Figure 7:
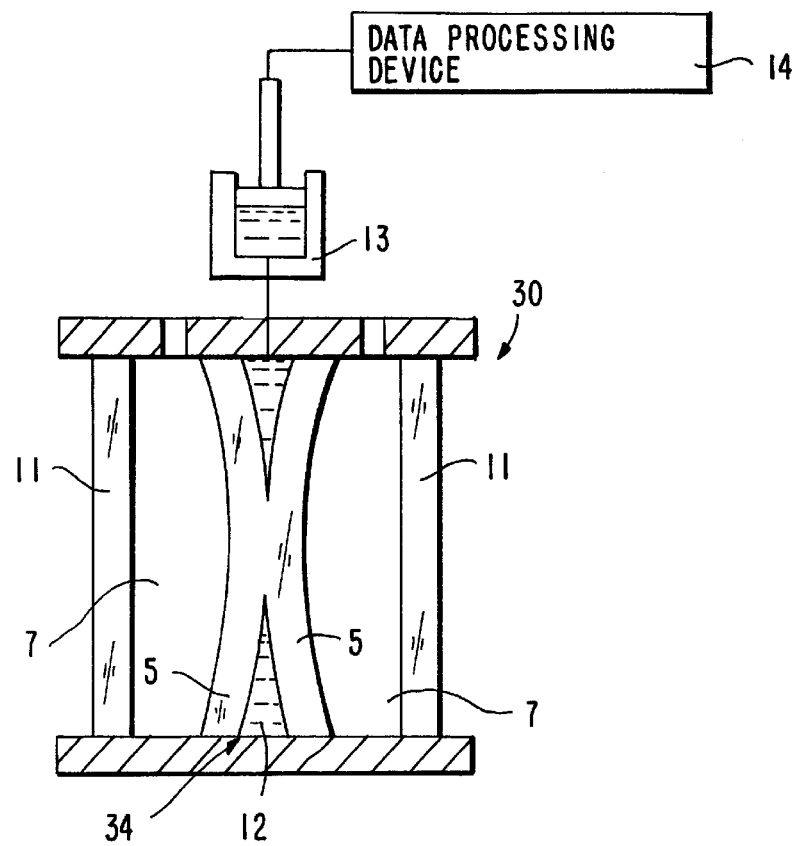
FIGS. 7 and 8 show another imaging system according to an embodiment of the present invention with a diaphragm in closed and opened state.
Figure 8:
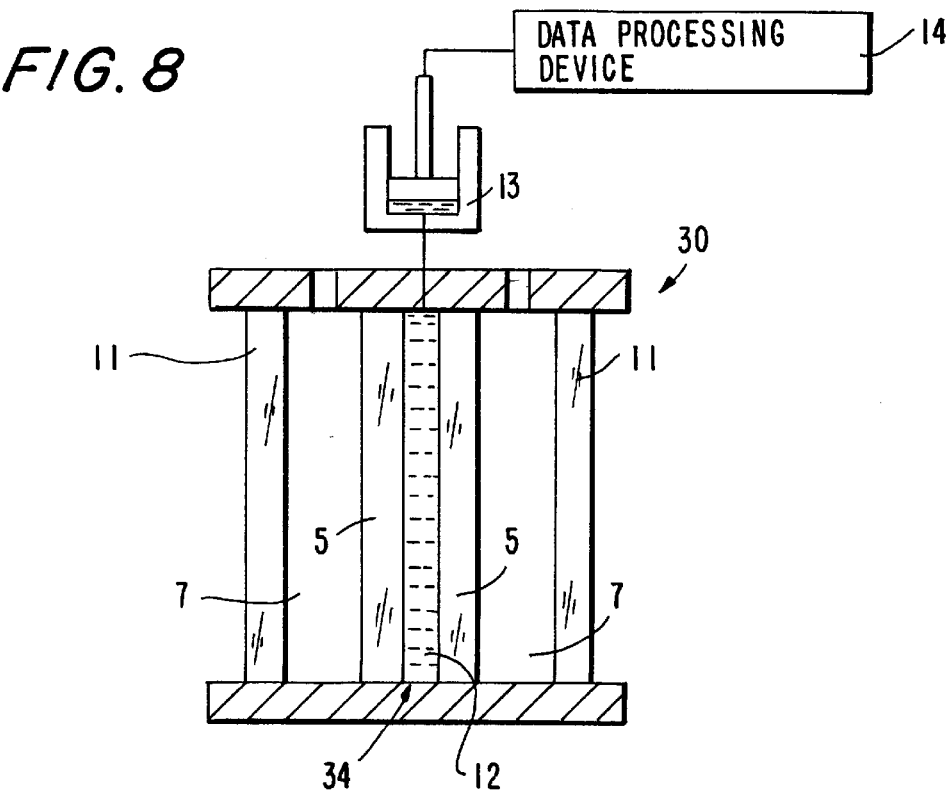

The imaging system according to the invention can be further improved in that a diaphragm, if possible with a variable diaphragm aperture, is arranged in the beam path of the light. An embodiment example for a suitable diaphragm imaging system 30 is shown schematically in FIGS. 7 and 8. FIG. 7 shows a diaphragm in the closed state. It is again accommodated in a housing 4 which is provided on both end sides, e.g., with rigid transparent cover disks 11. Similar to a liquid-filled flexible lens, the actual diaphragm 32 is formed of a hollow space that is filled with a liquid 12 and enclosed between the housing 4 and two closely spaced transparent elastic membranes 5. The liquid 12 is not transparent to light. When liquid is removed from the hollow space of the diaphragm by the liquid conveying device 13, the two membrane walls 5 curve toward one another and contact in a circular area around the optical axis due to the external pressure acting on the membrane walls 5. In order to support the deformation, a pressure increase can also purposely be carried out in the intermediate spaces 7 as in the case of the flexible lenses. Since there is no longer any nontransparent liquid in the circular contact area of the two membrane walls 5, the light beams can pass through this region. The circular area around the optical axis of the diaphragm accordingly constitutes the diaphragm aperture. Depending on the intensity of the deformation of the elastic membrane walls 5, the diaphragm aperture can be adjusted to values of different magnitude for controlling a brightness of the image recorded by the image sensor 8. The brightness may also be regulated by the data processing device 14 by controlling the exposure time and amplification of the signals transmitted by the image sensor 8.

FIG. 9 shows an imaging system 16 according to the invention in a block diagram. The imaging system 16 is formed of a system of flexible lenses 1 (with one or more intermediately arranged diaphragms 32, as the case may be), the image sensor 8, the electronic data processing device 14, and the actuating meas 15. An object A to be imaged by this imaging system 16 radiates light into the system of the flexible lens 1, as is indicated by the broad arrows, and through the latter onto the image sensor 8. The image signals generated by the image sensor enter the data processing device 14 and are corrected therein, if need be, with respect to brightness and distortions (in real time). The image signals emitted by the imaging system 16 according to the invention, e.g., to a system control, not shown, are represented by arrow B. The reference values of the imaging scale, i.e., the respective desired zoom stages, can be given externally by appropriate input into the data processing device 14 (arrow x). In accordance with these presets, the preset values required for the adjustment of the flexible lenses 1 are read out of a storage, not shown, of the data processing device 14 and delivered to the actuating means 15. The actuating means 15 then adjust the lenses 1 in the desired manner.

A substantial advantage of the present invention consists in that no changes in axial spacing are required in order to change the focal lengths of optical lenses or lens groups and, in the event that diaphragms are used, conventional mechanical displacing mechanisms such as those known from camera technology can be dispensed with. It is accordingly possible to design an imaging system which is extremely compact and which therefore requires only a small installation space. If needed, it is easily possible to achieve an imaging accuracy suitable to industrial applications with stricter requirements in this respect by means of measures for electronic image correction. The omission of conventional precision-mechanical drives brings about substantial savings on production costs. This makes it possible, for example, to develop a miniature recording device for digital document archiving with sufficient efficiency at very low cost, wherein a device of this kind could be integrated, e.g., into a desk lamp construction by reason of its small structural volume.

I claim:

1. An optoelectronic imaging system, comprising:

a housing;

first and second flexible optical lenses having adjustable surface curvatures spaced apart from one another in said housing and fixed against displacement relative to one another along an optical axis;

an actuating device operatively connected to said first and second lenses for mechanically adjusting said surface curvatures of said first and second lenses;

a data processing device mounted in said housing for receiving and recording and image transmittal via a beam path through said first and second lenses and signally connected to said actuating device for controlling an image sharpness and an imaging scale;

said data processing device comprising a storage device having stored values for the adjustment of the focal lengths of said first and second lenses for controlling said imaging scale of said optoelectronic imaging system;

an electronic image sensor operatively mounted on said housing for receiving and recording an image transmitted via a beam path through said first and second lenses and signally connected to said data processing device for transmitting an image signal to said data processing unit for controlling said imaging sharpness of said optoelectronic imaging system by adjusting said actuating device in response to said image signal; and wherein said data processing device and said image sensor are arrangeable together on an electronic chip.

2. The optoelectronic imaging system of claim 1, wherein said data processing device comprises an image correction unit program for compensating for optical imaging errors and distortions due to inadequate adjustment of said surface curvatures of said first and second lenses.

3. The optoelectronic imaging system of claim 2, wherein said image correction unit program is operatively configured for regulating an image brightness of an image recorded by said image sensor in response to values of adjustment of the actuating device.

4. The optoelectronic imaging system of claim 3, wherein said brightness is regulated by adjusting an exposure time and an amplification of said image signal transmitted by said image sensor.

5. The optoelectronic imaging system of claim 1, wherein a portion of said flexible lenses utilized for receiving the beam path of said image comprises a unitary flexible material that is transparent to light.

6. The optoelectronic imaging system of claim 1, wherein each said first and second lenses comprises a hollow body filled with a liquid and at least one outer surface of said first and second lenses located in the beam path comprises a flexible membrane wall.

7. The optoelectronic imaging system according of claim 6, wherein both outer surfaces of said first and second lenses comprise a flexible membrane wall.

8. The optoelectronic imaging system of claim 6, wherein said liquid comprises a low dispersion.

9. The optoelectronic imaging system of claim 6, wherein an internal volume of said hollow body of each said first and second lenses is minimized for narrowly limiting a hydrostatic pressure of said liquid.

10. The optoelectronic imaging system of claim 6, wherein a thickness of said flexible membrane wall varies in magnitude from said optical axis to a periphery of said one of said first and second lenses.

11. The optoelectronic imaging system of claim 1, further comprising diffractive structures arranged on surfaces of said first and second flexible lenses to compensate for aberrations.

12. The optoelectronic imaging system of claim 1, wherein said actuating device comprises piezo-actuators arranged peripherally at said first and second lenses.

13. The optoelectronic imaging system of claim 2, wherein said actuating device comprises a liquid conveying device, wherein said surface curvatures of said first and second lenses are adjsuted by influencing said volume of said respective hollow body.

14. The optoelectronic imaging system of claim 1, further comprising a conventional len arranged in a beam path of said light at a fixed axial distance from said first and second flexible lenses.

15. The optoelectronic imaging system of claim 1, further comprising a diaphragm arranged in said beam path of said image.

16. The optoelectronic imaging system of claim 15, wherein said diaphragm comprises a hollow body formed between two flexible, closely spaced, transparent membrane walls and filled with a non-transparent liquid, wherein said membrane walls are moveable into direct contact with one another in the form of a circular area with a desired diameter by changing the differential pressure between the outer surface of the membrane walls and the interior of the hollow body.

* * * * *